No. 898,257. PATENTED SEPT. 8, 1908.
C. A. PARSONS & G. G. STONEY.
TURBINE.
APPLICATION FILED MAY 15, 1906.
3 SHEETS—SHEET 1.
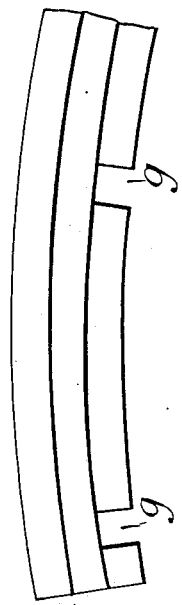
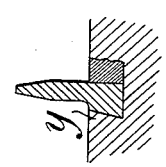
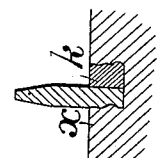
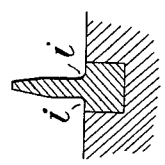
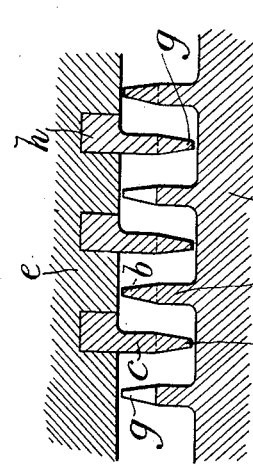
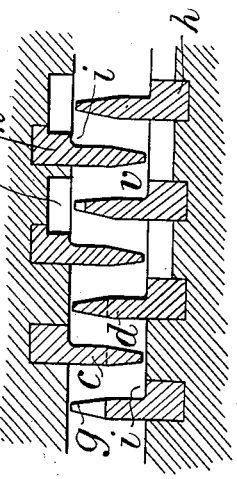

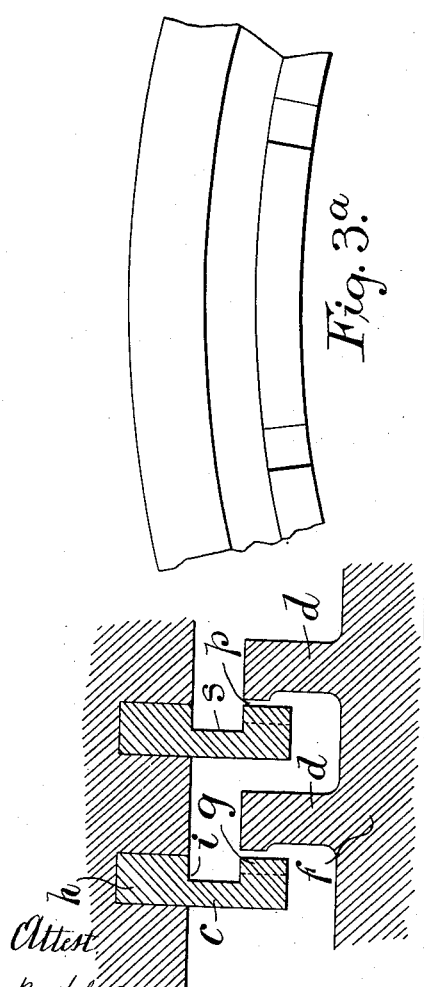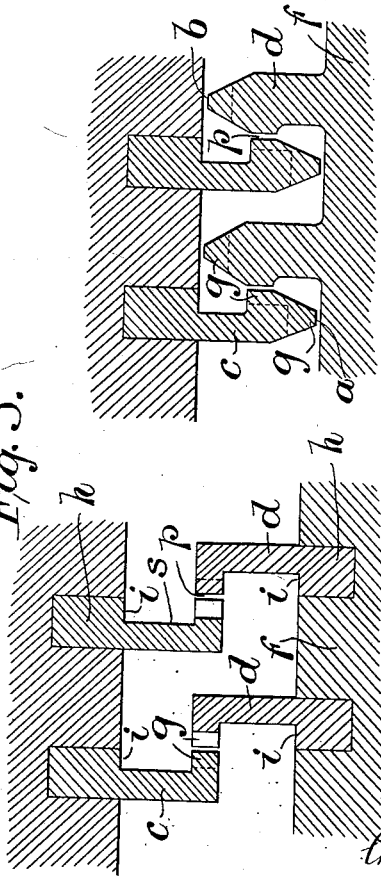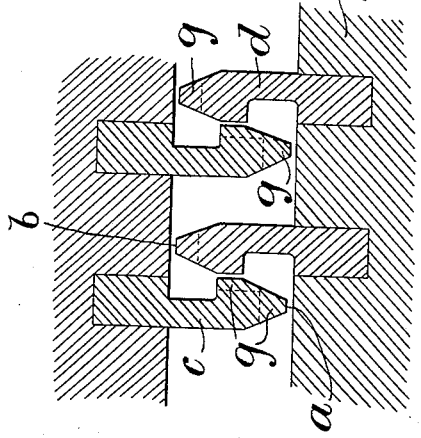

No. 898,257. PATENTED SEPT. 8, 1908.
C. A. PARSONS & G. G. STONEY.
TURBINE.
APPLICATION FILED MAY 15, 1906.
3 SHEETS—SHEET 3.
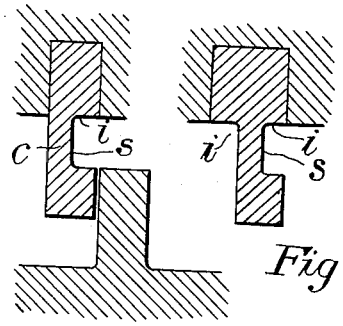
Fig. 7. Fig. 8.
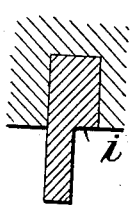 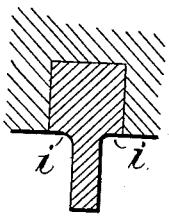 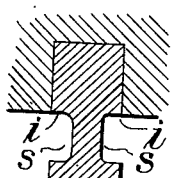 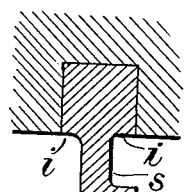
Fig. 9.  Fig. 10.  Fig. 11.  Fig. 12.
Fig. 6.ª
Attest.
BenthStahl
Edward N. Sartou
Inventors.
Charles A. Parsons.
George G. Stoney.
By Spear Middleton Donaldson Spear
Atty's.

UNITED STATES PATENT OFFICE.

CHARLES ALGERNON PARSONS AND GEORGE GERALD STONEY, OF NEWCASTLE-UPON-TYNE, ENGLAND; SAID STONEY ASSIGNOR TO SAID PARSONS.

TURBINE.

No. 898,257.  Specification of Letters Patent.  Patented Sept. 8, 1908.

Application filed May 15, 1906. Serial No. 316,966.

*To all whom it may concern:*

Be it known that we, CHARLES ALGERNON PARSONS and GEORGE GERALD STONEY, subjects of the King of Great Britain and Ireland, residing at Heaton Works, Newcastle-upon-Tyne, Northumberland, England, have invented new and useful Improvements in and Relating to Turbines, of which the following is a specification.

This invention relates to improvements in the methods of constructing baffling devices and securing them to the members which carry them.

The baffling devices employed in the balancing pistons, blading, glands or other parts of turbines and the like rotary machines, such as turbo-pumps and compressors, usually consist of strips or shrouds of brass, steel or other suitable metal formed with straight edges, *i. e.*, continuous edges, in close proximity to the opposing member of the turbine. Those baffling strips have generally been secured in position by calking the metal of the revolving or fixed carrying member so as to cause it to grip the strips. It has been found that, in consequence of the narrow clearance required between the projecting strip and the opposing member of the turbine, any grit or chips of metal passing through the turbine with the steam are apt to injure the edges of the strips, turning them over to a mushroom form and in some cases damaging them to such an extent as to necessitate renewal. This effect becomes most serious in the baffles farther removed from the steam side of the turbine. It has been found that when the strips are secured as above described and require to be renewed, the metal of the carrying member, especially if it be of cast iron, becomes so damaged in taking out the old strips and putting in new ones as to render fastening of the new strips difficult and somewhat insecure.

The object of this invention is to provide a strip which shall be more durable and readily and firmly secured in position without the risk of damaging the metal which carries it.

The invention consists in forming the baffle surface or surfaces with one or more nicks or passages of sufficient size to allow small grit or chips to pass freely through the baffle packing by way of these nicks.

The strips may be either in the stationary or revolving member or both and the nicks or passages may be formed in any convenient part of the baffle surfaces, *i. e.*, in the edge or side of the strip or in the side and edge or in the edge of one and the side of another strip or in the surface of either the rotary or fixed member or both of them opposite the edge of the strips. It is found that the small nicks or passages in the baffling portion of the packing allow grit or chips to pass through without injuring the edge of the strips while they make an inappreciable difference to the passage of the steam between the opposing members of the turbine. Such nicks or passages may be used in the packings of balancing pistons, glands and in the blade shrouds or other baffling parts of turbines or of turbo-compressors for water, gas or other fluid.

The invention also consists in forming a baffle strip or set of strips with a ledge or ledges near the root and securing the strip in the groove of the carrying member by calking the said ledge or ledges so as to swell the metal and thereby cause it to grip tightly in the groove.

In the accompanying drawings which represent various arrangements of baffle packing, constructions of baffles and methods of securing baffle strips to the carrying members, Figures 1 and 1ª, show an arrangement of baffles in which nicks or passages are formed in the projecting edges of the baffles. Fig. 2 represents a modified form of baffle device, the left hand portion showing nicks cut in the edge of the baffles and the right hand portion showing the nicks or passages cut in the surface of the fixed and rotating members. Figs. 3 and 3ª show forms of packing in which baffling is effected by the sides of adjacent baffle rings and nicks or passages are formed in the side of one of the baffle rings. Fig. 4 shows a somewhat modified form of packing device in which the nicks or passages are formed in adjacent sides of both rings. Figs. 5, 6 and 6ª, show modified constructions of baffle devices in which baffling is effected both by adjacent sides and the edges of the baffle rings and nicks are cut in a side of one ring of a pair and in the edges of both rings. Figs. 7 to 12 and 2ª, 2ᵇ, 2ᶜ, show various constructions of strip and methods of securing them to the carrying member.

In carrying out the invention as illustrated in Figs. 1 and 1ª, the projecting edges, a and b, of the baffles, c and d, carried respectively by the rotary and fixed portions, e and f, of the turbine, are used for baffling, and in these edges are formed nicks or passages, g, g, see Fig. 1ª, whereby particles of grit, metal or the like carried along with the fluid are enabled to pass through the packing without damaging the rings. The rings in the rotary member of the turbine are preferably made of rolled, drawn or otherwise produced metal strips and are formed with a thickened root portion, h, so as to present a ledge i. The rings, d, on the other member may be formed in one therewith as shown in Fig. 1 or of separate strips fastened in similar to c, as shown in Fig. 2. In the left hand side of this figure the passages are shown cut in the edges of the strip, but the same effect is obtained by cutting them in the surfaces of the fixed and rotating members opposite the edges of the strip as shown at t and u in the right hand side of Fig. 2. In some cases nicks or passages may be provided in the surface of one member as shown in the right of Fig. 2, and in the edges of the strips or rings carried by that member. When the strips are inserted in the narrow groove in the turbine member the ledge, i, comes about flush with the face of the metal of the carrier, the ledges being of sufficient width to enable the application to them of a calking tool whereby the metal of the strip is swelled into the groove. By this method of fixing the strips the usual damage to the metal of the carrier is avoided. Instead of forming the edge baffles with a single ledge as shown in Fig. 1 they may be formed with a double ledge, i, as shown in Fig. 2ª.

The grooves in which the strips are secured may be serrated as shown at x on the left of Fig. 2ᵇ or dovetailed as shown at y, on the left of Fig. 2ᶜ. In accordance with another construction the strip may be held in position in the groove by means of a calking strip, k, on one side (see Figs. 2ᵇ and 2ᶜ) with or without the aid of a ledge on the other side of the baffle strip. When used with a ledge the calking strip and the ledge may both be calked.

Instead of using the edges of the strips or rings for baffling as above described, the sides alone may be used as shown in Figs. 3, 4 and 7 or the sides in combination with the edges as shown in Figs. 5 and 6. The baffling rings, d, in the member, f, may be made in one with that member as shown in Fig. 3 or in the form of strips secured in grooves as shown in Fig. 4. The strips may be rolled, drawn or otherwise formed with a groove or recess, s, on one side so as to form a calking ledge, i, on one side, as shown in Figs. 3, 4 or 7 or they may be formed with such grooves on both sides forming double calking ledges as shown in Fig. 11 or with a groove one side and a ledge on both sides as shown in Figs. 8 and 12 or with plane sides as shown in Figs. 9 and 10, a calking ledge being provided on one and both sides respectively.

Nicks or passages, g, may be formed in the rings, c or d, or in both. In Figs. 3 and 3ª, the nicks, g, are shown in the side of c, only but in Fig. 4 they are shown in the sides of both the rings, c and d. In Figs. 5 and 6 the rings are arranged for both radial and lateral baffling, but in Fig. 5 the rings, d, are formed in one with the opposing member, f, while in Fig. 6 they are formed with ledges and calked into the grooves. The adjacent sides of the rings of each pair of rings, d and c, are recessed so as to leave somewhat narrow side baffling surfaces, p, and the outer portions are tapered towards the baffling edges, a and b which come into close proximity to the opposing members, f and e, the sides p and q, of each pair of rings likewise coming close together. In this manner the edges and adjacent sides of a pair of rings are utilized. Nicks or passages are formed in the baffling edges and in the side or sides of one or both rings of a pair for the purpose already explained. In some cases where side baffling surfaces are used in combination with edge baffling, the nicks or passages may be formed in one or both side surfaces and in the baffling surfaces of either the fixed or rotating turbine member or both opposite the edges of the rings. The nicks are preferably formed on the surface of greatest radius. It will be understood that these passages may be formed in constructions of baffle ring other than those herein described and in other places as for instance in blade shrouds, or the base rings against which shroud rings bear for the purpose of steam packing.

Having now described our invention what we claim as new and desire to secure by Letters Patent is:—

1. In turbo-machinery, a rotary baffle packing device having an opening in a baffle part thereof, substantially as and for the purpose described.

2. In turbo-machinery, a rotary baffle packing device having openings in baffle parts thereof, substantially as and for the purpose described.

3. In turbo-machinery, a rotary baffle packing device having openings in baffling parts of fixed and rotating parts, substantially as and for the purpose described.

4. In turbo-machinery, a rotary baffle packing device, having an opening in a baffle part thereof and a ledged strip, substantially as and for the purposes described.

5. In turbo-machinery, a rotary baffle packing device, having openings in baffle portions thereof and calking ledges on strips thereof, substantially as and for the purposes described.

6. In turbo-machinery, a rotary baffle packing device having openings in baffling parts of fixed and rotating members and strips with calking ledges substantially as and for the purposes described.

7. In turbo-machinery, a rotary baffle packing device having openings in baffling parts of fixed and rotating members and strips having a calking ledge on one side, substantially as and for the purposes described.

In testimony whereof we have signed our names to this specification in the presence of two subscribing witnesses.

CHARLES ALGERNON PARSONS.
GEORGE GERALD STONEY.

Witnesses:
HENRY GRAHAM DAKYNS, Jn.,
WILLIAM MENZIES JOHNSTON.